United States Patent [19]

Vezie

[11] 4,302,088
[45] Nov. 24, 1981

[54] CAMERA FOR RECORDING SOLAR ACCESS TO A SITE

[76] Inventor: Richard L. Vezie, 233 Patterson St., Ashland, Oreg. 97520

[21] Appl. No.: 168,042

[22] Filed: Jul. 14, 1980

[51] Int. Cl.³ .................. G03B 17/24; G03B 17/00
[52] U.S. Cl. ................................. 354/107; 354/202
[58] Field of Search ................. 354/105–110, 354/154, 203, 202, 199, 219; 355/40 FP

[56] References Cited

U.S. PATENT DOCUMENTS

| | | | |
|---|---|---|---|
| 1,490,487 | 4/1924 | Schmidt | 354/109 |
| 2,352,176 | 6/1944 | Bolsey | 354/110 X |
| 3,006,248 | 10/1961 | Linke et al. | 354/202 |
| 3,340,784 | 9/1967 | Zimberoff | 354/109 |
| 3,478,657 | 11/1969 | Michels | 354/107 |

FOREIGN PATENT DOCUMENTS

| | | | |
|---|---|---|---|
| 648955 | 8/1937 | Fed. Rep. of Germany | 354/219 |
| 959612 | 3/1957 | Fed. Rep. of Germany | 354/203 |
| 2428419 | 1/1975 | Fed. Rep. of Germany | 354/106 |
| 2016156 | 9/1979 | United Kingdom | 354/106 |

*Primary Examiner*—Donald A. Griffin
*Attorney, Agent, or Firm*—James D. Givnan, Jr.

[57] ABSTRACT

A camera is disclosed as being of the pin hole type having a transparent member therewithin on which is printed sun paths for certain days of the year and local time sun positions for the purpose of superimposing same on the photograph taken. Obstructions to direct solar radiation may then be calculated from an examination of the resulting photograph to determine the suitability of a site for future use of solar energy. A compass and level on the camera body facilitate southerly orientation of the camera in a level position. Film rollers guide the film over the curved indicia bearing member. Film transfer means retains a film supply roll with a take-up spindle for exposed film. A shutter assembly permits light entry through a pin hole aperture with the camera having a short focal length for a wide angle field. The indicia bearing member is detachably mounted to enable substitution of appropriate like members for use at different latitudes.

12 Claims, 6 Drawing Figures

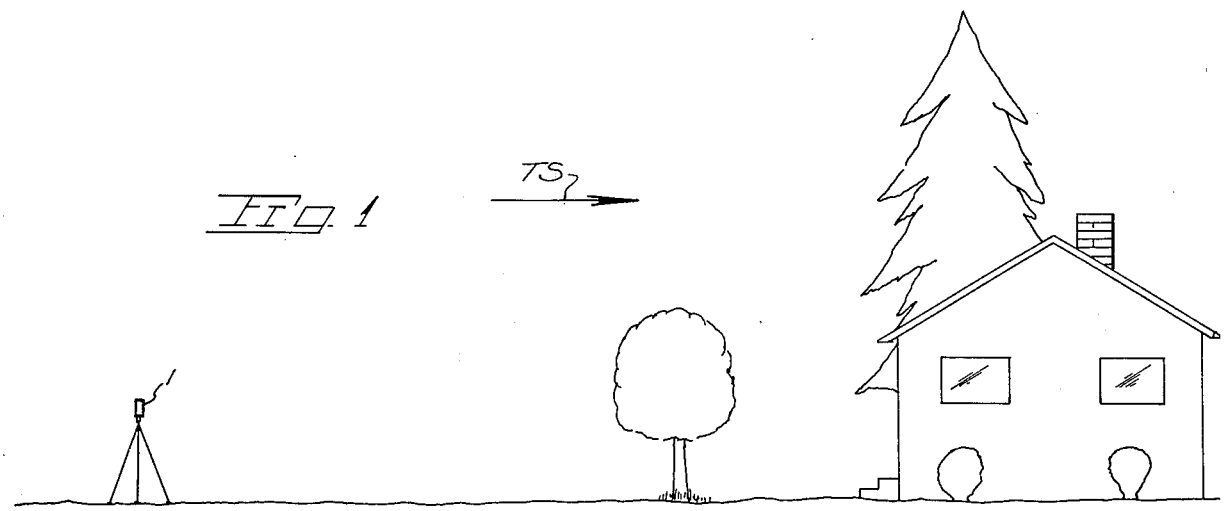
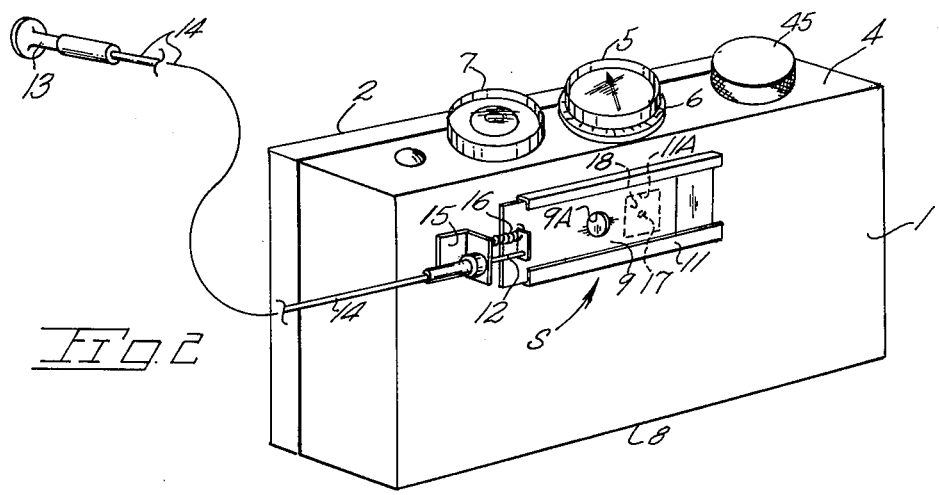
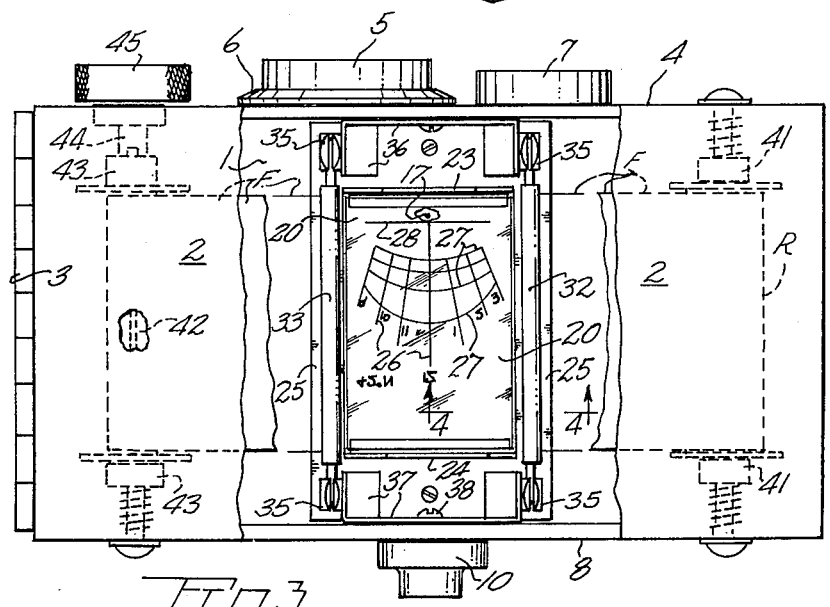
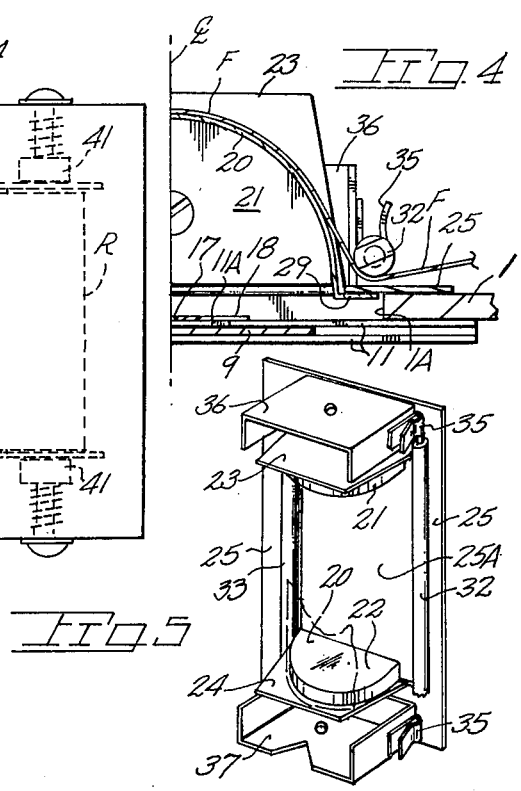

CAMERA FOR RECORDING SOLAR ACCESS TO A SITE

BACKGROUND OF THE INVENTION

The present invention concerns camera construction particularly a camera for taking exposures of a geographical site with an apparent sun path imposed on the exposure. To the extent known, the prior art teaches the superimposing or adding of data to a film exposure such as, for example, the imprinting of a date on the film negative as disclosed in U.S. Pat. No. 4,183,645. Additional U.S. Pat. Nos. 4,109,269 and 4,165,932 disclose systems within a camera imparting an image to a film exposure such an image being accomplished by use of a light source and focusing lens within the camera body.

U.S. Pat. No. 3,012,840 discloses a camera for race track use with provision made for imparting a finish line image to the expose film.

U.S. Pat. Nos. 672,885 and 3,678,836 disclose broadly the combination of a camera with a level, said patents disclosing respectively a combination land survey instrument and camera, and secondly a level bubble component used in a camera focusing system.

Also in the prior art is an instrument termed a visual solar calculator marketed by Lewis and Associates, of Grass Valley, California, which includes an adjustable compass bearing support adapted for true south orientation in a leveled manner with a transparent sun path graph being supported in an upright manner with sun path lines imprinted thereon. An eye piece permits viewing of obstructions through the transparent graph by which a determination can be made as to the extent of solar blockage from natural or man-made obstructions. Lines on the graph indicate apparent sun travel at different monthly dates so that a calculation may be made as to whether or not adequate direct solar radiation exists at a prospective solar utilizing site to warrant installation of solar powered equipment.

SUMMARY OF THE PRESENT INVENTION

The present invention is embodied within a camera incorporating a representation of the sun's path (or paths) for superimposition of same on a film exposure to photographically record the amount of unobstructed solar radiation at a geographical location.

The suitability of any site for utilizing solar radiation, such as a heating system within a home, is to a great extent dependent upon the daily duration of system glazing exposure to direct solar radiation. In certain instances existing man-made or natural obstructions at a site may indicate that solar radiation is so obstructed that the installation of solar equipment would be impractical.

In the effort to promote use of solar power, some state and federal agencies are rendering assistance to individuals in the form of tax credits for costs expended in the installation of solar equipment. Further assistance is envisioned in the providing of low interest loans to finance procurement and installation of such equipment. Guidelines are being considered as to minimum acceptable hours of direct solar radiation to qualify for such benefits.

A need has also arisen for historically documenting site access to direct solar radiation as of a certain day and date in view of envisioned municipal ordinances which would restrict the erection of building construction hindering such access. Currently, to the inventor's knowledge, no such documenting means exists to provide a permanent, acceptable record of solar site radiation at a site as of a certain date by which a determination could be made regarding the radiation blockage of proposed construction at an adjacent site.

The present camera includes indicia representing the apparent path travelled by the sun during the critical solar radiation periods, i.e., the fall and winter months in the northern hemisphere, which representation is ultimately superimposed on a photograph taken in a southerly direction from the prospective solar using site. Examination of the photograph will determine whether or not adequate solar exposure exists by reason of the photographed obstructions at the site conflicting with the sun path lines on the photograph. For example, one proposed state guideline would be that the glazing of a solar system would have to be exposed to direct solar radiation for a period of at least four hours on December 21st, the winter solstice. To facilitate calculation of exposure time, the sun path indicia member in addition to being provided with apparent sun path lines is provided with local hour lines. The indicia members may be substituted for one another to permit adaptation of the camera for use at different latitudes to compensate for sun path elevation above the horizon.

Provision is made for facilitating orientation of the camera toward true south and for levelling of the camera. Light entering the camera imparts an image to the film which is located in place over the sun path indicia member. Film guiding means assures impositioning of the film over the surface of said member. The film exposure, by reason of being supported in place on the curved member, avoids image distortion. Additional provision is made for transferring film from a supply roll to a take-up roll. The camera is also provided with a tripod receiving receptacle.

Important objects of the present camera include the provision for photographing a geographical area south of an intended solar utilizing site with the photograph having a superimposed line representing the apparent path of the sun so as to permit evaluation of the degree to which solar radiation is hindered by obstructions both man-made and natural; the provision of a camera including an indicia bearing member having a representation of the sun's apparent travel across the sky with provision made for locating the film so as to cause the representation to be apparent on the resulting photograph; the provision of a camera providing means for interchangeably mounting different sun path graphs adapting the camera for use at different latitudes; the provision of a camera for rendering photographic and historical evidence of the presence and/or absence of obstructions at a geographical site for purposes of site evaluation of potential solar benefits and for a record as to the obstructions present as of the date of the photograph.

BRIEF DESCRIPTION OF THE DRAWINGS

In the drawings:

FIG. 1 is an elevational view of the present camera in place for photographing a site immediately south of a prospective solar radiation utilizing installation;

FIG. 2 is a perspective view of the present camera;

FIG. 3 is a rear elevational view of the camera with fragments broken away for illustration purposes;

FIG. 4 is a sectional view taken upwardly along line 4—4 of FIG. 3;

FIG. 5 is a perspective view of a sub-assembly of the camera and an indicia bearing member in place thereon.

DETAILED DESCRIPTION OF THE PREFERRED EMBODIMENT

Figure 6:
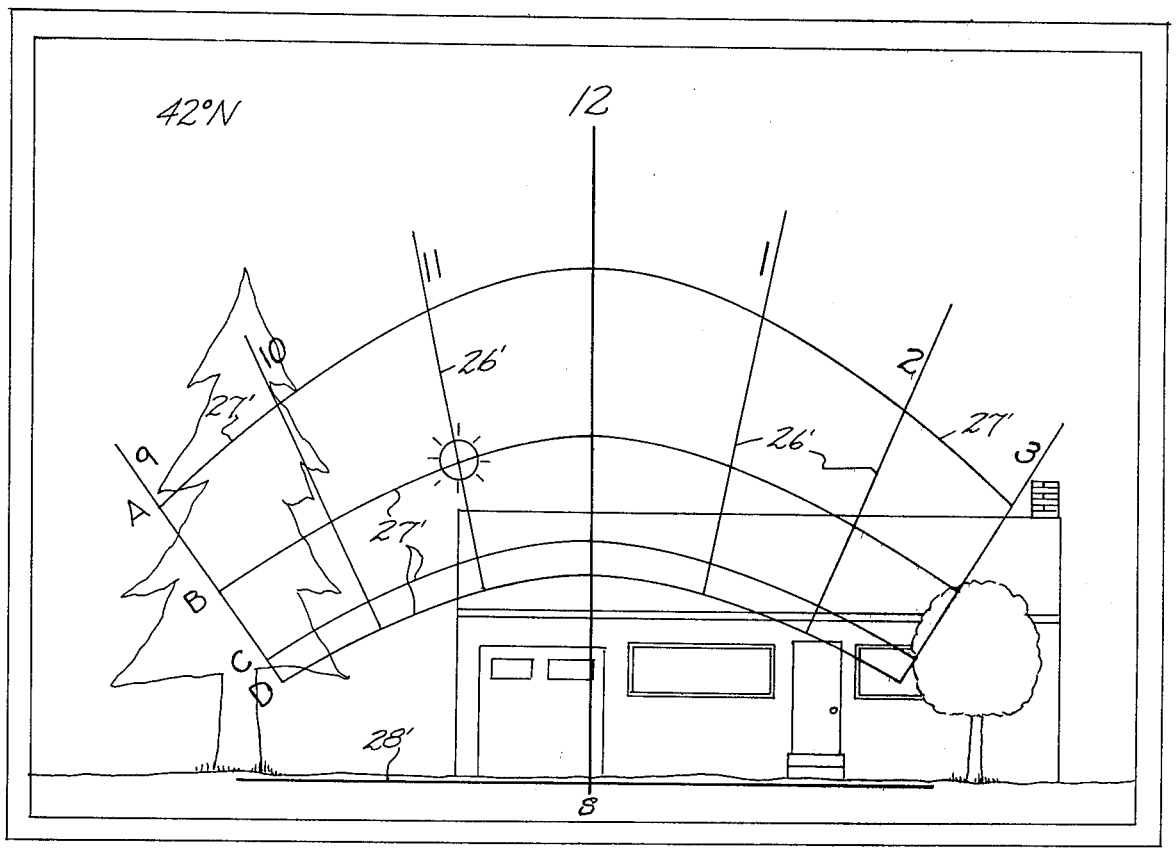
FIG. 6 is a view of a hypothetical photograph taken with the camera in the FIG. 1 location.

With continuing attention to the drawings, the reference numeral 1 indicates the front wall of the present camera body closed by a back 2 suitably mounted at 3. A top wall 4 supports a magnetic compass 5 having a rotatable bezel 6 and also a bubble level at 7 which for reasons of convenience may be of the circular type. A bottom wall 8 of the camera carries a tripod socket 10. At 1A is a front wall opening.

Front wall 1 supports a shutter assembly generally at S including a shutter plate 9 apertured at 9A. Said plate moves rectilinearly within a guide 11 suitably affixed to camera front wall 1. Shutter actuation is by a cable 12 connected at its opposite end to a finger actuated plunger 13 moving cable 12 within a suitable flexible housing 14. A cable release mount 15 also serves to carry one end of a shutter retracting spring 16. A pin hole at 17 is formed within a metallic sheet at 18 (FIG. 4) on the inner side of the shutter guide 11 which is open at 11A.

An indicia bearing member at 20 is disclosed in curved configuration about an upright axis, said member supported in place on upper and lower semicircular plates 21 and 22 with each plate supported in turn on upper and lower horizontal flanges 23 and 24 of a mounting frame 25 attached to the interior surface of camera front wall 1. A frame open area is at 25A, as best seen in FIG. 5, through which pin hole admitted light passes. Opaque lines 26 on indicia member 20 represent local time sun positions while lateral, curved opaque lines 27 represent the sun's travel above the horizon at different calendar dates above a horizon line 28. The member 20 is formed of translucent flexible material permitting rearward bowing or shaping thereof about curved supports 21 and 22. Attachment in a removable manner is by laterally extending flanges 29 (FIG. 4) being retained by insertion below the inner margins of mounting frame 25. The frame is attached to the inner wall surface of front wall 1 by mounting screws.

With attention to FIGS. 3, 4 and 5, film guide means includes rollers at 32 and 33 in juxtaposition with the member 20 lateral edges and in close proximity with the inner front wall surface of the camera to cause film at F to be entrained thereunder to traverse virtually the entire arcuate surface of indicia member 20. Supporting reduced ends of rollers 32 and 33 are upper and lower pairs of yieldable clips 35 each supported by upper and lower camera mounted clip brackets 36 and 37. Said brackets are of formed metal construction and secured to camera top and bottom walls by machine screws as at 38.

Film transfer means includes spring urged carriers 41 biased into endwise engagement with a film roll R. A take-up spindle at 42 is slotted for film reception and is carried by end engaging carriers 43 one of which is spring biased into spool engagement while the remaining carrier is slidably carried on a slotted stub shaft 44 associated with a winding knob 45. Other film transfer means may be entirely suitable for use with the present camera.

Pinhole 17 has proved satisfactory when of a diameter of 0.012 thousandths of an inch.

In use, film installation is facilitated by removal of film guide rollers 32 and 33 whereupon a loaded film spool is engaged with carriers 41 and the film leader threaded into slotted take-up spool 42. Film rollers 32 and 33 are reinstalled within their respective clips to confine the film downwardly into surfacial engagement with the curved surface of indicia member 20. The camera is supported in place upon a tripod with the compass and bezel being utilized to orientate same toward true south. The camera is levelled with reference to bubble level 7. Shutter release admits light through the lens assembly with exposure time not being critical with one-half to two seconds being appropriate for a sunny day and with two to five seconds being necessary on a cloudy or overcast day.

The resulting photograph is illustrated in FIG. 6 wherein the photographed house shown in FIG. 1 constitutes an obstruction to direct solar radiation as does the tree. The sun on November 22nd and January 22nd as it follows path line C as well as the sun on December 22nd as it traverses path D will be obscured by the house somewhat before 11:00 A.M. local time for the balance of the day. On October 22nd and February 22nd when the sun traverses path B direct solar radiation will occur from 10:00 A.M. to 2:00 P.M. On September 22nd and March 22nd when superimposed path A is traversed obscuration of the sun by the tree will occur from 9:00 A.M. to 10:00 A.M. Accordingly, an analysis of the photo will determine whether or not the applicable direct solar radiation criteria have been met. Further, the photo may be authenticated as of a certain date to verify solar access at a site as of that date. A horizon line is at 28' in FIG. 6 while local time sun position lines are at 26' with lines 27' representing the path or course of the sun at the aforementioned dates. The indicia member 20 is as earlier mentioned detachably mounted within the camera to permit substitution of other indicia bearing members having like opaque sun path lines thereon spaced from the horizon line so as to render an accurate sun path image on the film exposure appropriate for the closest latitude.

One embodiment of the camera has a focal length of approximately three quarters of an inch.

At the higher latitudes, for example 48 degrees north, it may be advisable to mount a pair of cameras at right angles to one another with one camera facing a true 135 degrees and the other facing a true 225 degrees respectively for the purpose of photographing the entire sun path which at the higher latitudes is a substantially wider arc than the apparent sun paths at lower latitudes. Use of paired cameras would entail the transparent indicia bearing member 20 in the first camera being imprinted with the sun path lines to twelve o'clock noon and the remaining camera with a continuation (in effect) of such lines from twelve o'clock noon on. With this arrangement, entire sun paths above the horizon may be imprinted on the film negative regardless of the paths being considerably wider than those of the same date at lower latitudes. The relative simplicity of the present camera makes such paired use feasible from a cost standpoint.

While I have shown but one embodiment of the invention it will be apparent to those skilled in the art that the invention may be embodied still otherwise without departing from the spirit and scope of the invention.

Having thus described the invention, what is desired to be secured under a Letters Patent is:

1. A camera for photographing a geographical site and superimposing indicia on the film exposure to evaluate solar access to the site, said camera comprising, a body defining an internal area, a shutter assembly thereon including light admitting means for film exposure, an indicia bearing member within the internal area and having both light translucent and opaque areas, said indicia bearing member in the path of shutter admitted light, said opaque areas constituting indicia representing an apparent path of the sun above a horizon viewed through the camera, and film guide means within said body adapted to guide the film past said indicia bearing member whereby shutter assembly actuation results in an image of the photographed object being imparted to the so positioned film when exposed along with the imparting of an image of the indicia to the film.

2. The camera claimed in claim 1 wherein said film is at least in partial supported surfacial contact with said indicia bearing member.

3. The camera claimed in claim 1 wherein said light admitting means includes a pinhole aperture.

4. The camera claimed in claim 1 wherein said indicia bearing member is of substantially semicircular configuration in transverse section to inhibit image distortion.

5. The camera claimed in claim 1 wherein said film retention means includes film guides located adjacent the extremeties of said indicia bearing member, said indicia bearing member having a major portion thereof offset rearwardly within the camera body relative said film guides.

6. The camera claimed in claim 5 wherein said guide means is embodied in a pair of rollers, means removably mounting said rollers in biasing contact with the film to urge the film into engagement with said indicia bearing member.

7. The camera claimed in claim 1 wherein said opaque areas of said indicia bearing member are embodied in curved lines representing the sun's apparent path above the horizon at different days of the year and additional lines intersecting the first mentioned lines and representing local time lines.

8. The camera claimed in claim 1 including a magnetic compass, a level, a socket for tripod attachment all on said camera body.

9. The camera claimed in claim 1 wherein said indicia bearing member is of a flexible nature adapted for detachable mounting within the camera, semicircular plates in said camera body imparting shape to said indicia bearing member.

10. The camera claimed in claim 9 wherein said indicia bearing member includes laterally directed flanges for retentive engagement with adjacent camera body structure.

11. The camera claimed in claim 1 wherein said opaque areas additionally include indicia representing a horizon.

12. The camera claimed in claim 11 wherein said opaque areas additionally include indicia representing local time sun positions at different times of the day.

* * * * *